US010822887B2

(12) United States Patent
Persent et al.

(10) Patent No.: US 10,822,887 B2
(45) Date of Patent: Nov. 3, 2020

(54) CONNECTOR FOR ASSEMBLING TWO SECTIONS OF A RISER, COMPRISING AN OUTER LOCKING RING AND SECURING MEANS

(71) Applicant: IFP Energies nouvelles, Rueil-Malmaison (FR)

(72) Inventors: Emmanuel Persent, Croissy sur Seine (FR); Gerard Papon, Les Essarts le Roi (FR); Jeremie Triadou, Carrieres Sous Poissy (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 16/096,391

(22) PCT Filed: Feb. 15, 2017

(86) PCT No.: PCT/EP2017/053419
§ 371 (c)(1),
(2) Date: Oct. 25, 2018

(87) PCT Pub. No.: WO2017/186373
PCT Pub. Date: Nov. 2, 2017

(65) Prior Publication Data
US 2019/0136642 A1 May 9, 2019

(30) Foreign Application Priority Data
Apr. 26, 2016 (FR) ...................... 16 53702

(51) Int. Cl.
*E21B 17/08* (2006.01)
*F16L 37/113* (2006.01)
*E21B 17/046* (2006.01)

(52) U.S. Cl.
CPC .......... *E21B 17/085* (2013.01); *E21B 17/046* (2013.01); *F16L 37/113* (2013.01)

(58) Field of Classification Search
CPC ..... E21B 17/046; E21B 17/085; F16L 37/113
See application file for complete search history.

(56) References Cited

U.S. PATENT DOCUMENTS

| 7,341,281 | B2 | 3/2008 | Guesnon et al. |
| 7,883,293 | B2 | 2/2011 | Paulsen |
| 2004/0207202 | A1* | 10/2004 | Parks .................... F16L 37/105 285/391 |

(Continued)

FOREIGN PATENT DOCUMENTS

| FR | 2866942 A1 | 9/2005 |
| WO | 2015/071411 A2 | 5/2015 |

OTHER PUBLICATIONS

International Search Report for PCT/EP2017/053419, dated May 29, 2017; English translation submitted herewith (5 pgs.).

*Primary Examiner* — James G Sayre
(74) *Attorney, Agent, or Firm* — Fitch, Even, Tabin & Flannery LLP

(57) ABSTRACT

The invention relates to a connector for assembling two sections of a riser. The connector comprises two riser sections that are assembled by a locking ring with the aid of two bayonet connections. The connector additionally comprises means for securing the locking ring against the connector elements.

27 Claims, 5 Drawing Sheets

(56) References Cited

U.S. PATENT DOCUMENTS

| | | | |
|---|---|---|---|
| 2007/0252387 A1* | 11/2007 | Beard | E21B 17/085 285/323 |
| 2010/0314863 A1* | 12/2010 | Ohara | F16L 37/091 285/31 |
| 2011/0037257 A1* | 2/2011 | Walker | E21B 17/01 285/337 |
| 2014/0232109 A2 | 8/2014 | Nguyen et al. | |
| 2016/0258562 A1 | 9/2016 | Bjoerneklett et al. | |

* cited by examiner

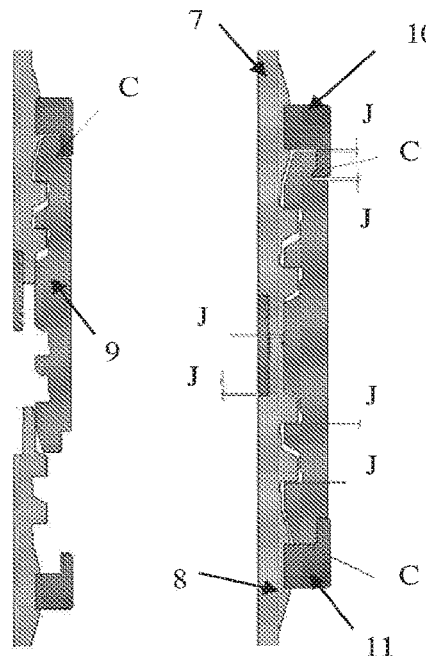
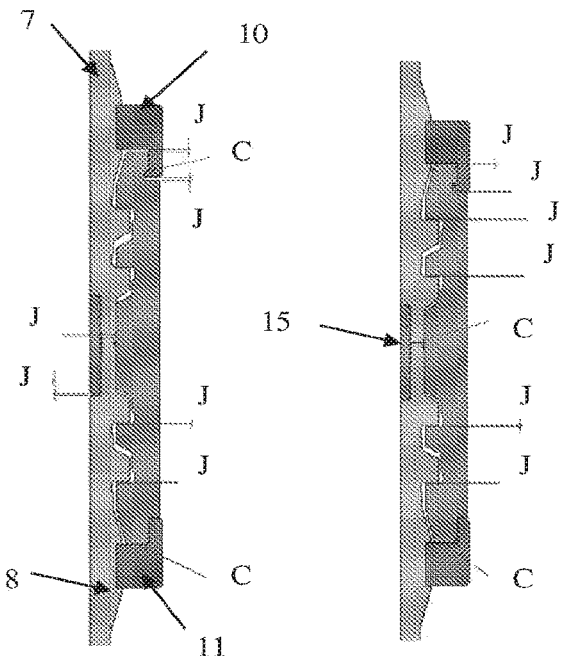
Figure 7a  Figure 7b  Figure 7c  Figure 7d
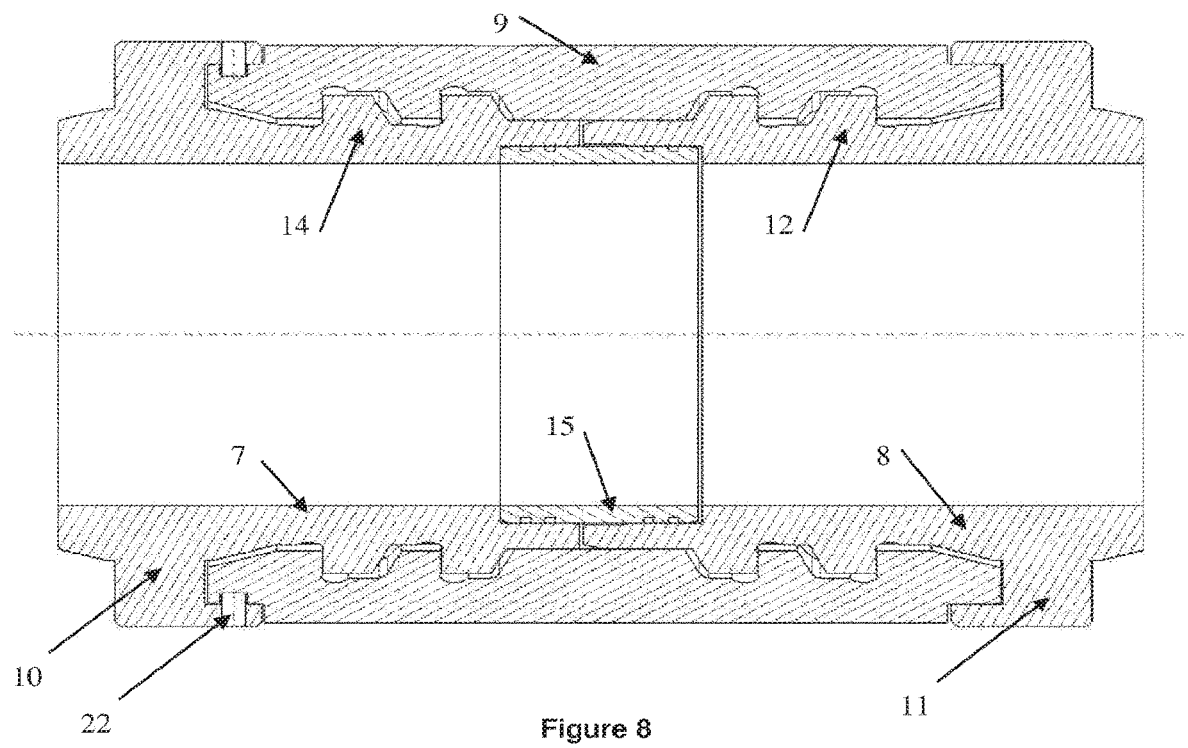
Figure 8

CONNECTOR FOR ASSEMBLING TWO SECTIONS OF A RISER, COMPRISING AN OUTER LOCKING RING AND SECURING MEANS

CROSS REFERENCE TO RELATED APPLICATIONS

Reference is made to PCT/EP2017/053419 filed Feb. 15, 2017, and French application Ser. No. 16/53,702 filed Apr. 26, 2016, which are incorporated herein by reference in their entirety.

BACKGROUND OF THE INVENTION

Field of the Invention

The present invention relates to offshore risers, notably for the production of petroleum effluent, the completion or the workover of a well. In particular, the invention relates to a riser connector.

Description of the Prior Art

A riser is made up of a set of tubular elements with a length of between 9 and 22 m (30 and 70 feet) that are joined together by connectors. The tubular elements generally are a tube provided with connectors at each end. The tubular elements are joined together by these connectors at the completion or workover site, from a floating support. The riser descends into the water column while the tubular elements are being joined together, until it reaches the wellhead situated on the seabed. A "completing" (riser) surface/bed connecting system is used to install the production string in the well and for the suspension of tubing through a drilling riser and the BOP. A (riser) surface/bed connecting system for workover is generally used instead of a drilling riser for working at the well through underwater wellheads, and can also be used for installing the underwater wellheads.

For the purpose of operating wells at water depths down to 3500 m or more, the weight of the riser becomes very disadvantageous.

Furthermore, the need to reduce the assembly time for risers is all the more essential, the greater the depth of water and thus the length of the riser.

Another problem with riser connectors relates to inspection and maintenance of the locking system. Specifically, in general, the locking systems which are used are not entirely removable. Therefore, it is not possible to inspect all of the locking system, in particular in the case of a locking ring.

A first type of solution which has been developed for riser connectors concerns connectors with a screwed connection. In order to realize such connections, the "upset pipe" method can be used, which creates an overthickness at the ends of the tubes by hot forging. This overthickness can be as much as twice the thickness of the main part. This type of connection requires particular tools in order to be implemented, and the number of connection/disconnection operations is limited, since the connection is preloaded by a significant tightening torque, and this can result in damage to the threaded portion on account of the high contact pressures at the threads.

A second type of solution which has been developed for riser connectors concerns connections with a preloaded sleeve. This type of connector requires particular tools for assembly.

US published patent application 2014/0232109 describes another riser connector design. The connector described in that patent application has locking segments which are rotatable about a pivot, and which have internal toothed portions engaged with peripheral slots made in the tubes to be assembled. This connection also requires specific tools for assembling the riser sections.

Another solution which has been conceived concerns bayonet connections.

Among bayonet connectors, a bayonet riser connector is disclosed in U.S. Pat. No. 7,883,293 with the bayonet riser connector comprising a female element and a male element which fit together. The connector is not entirely removable (in particular the female part), thereby limiting the maintenance and inspection of the connector. Moreover, for that connector, the seal is a metal-metal seal which is located at conical bearing surfaces, although the connector is not preloaded.

Moreover, the US published patent application 2004/0207202 discloses a bayonet riser connector which comprises two connecting elements, a sealing and guide sleeve, and a locking ring. The connector uses a pin as a retainer with the pin being situated at the center of the locking ring, and engaging with the sealing sleeve. The retainer does not allow the connector to be guided during the connection. Moreover, these retainers require precise relative positioning of the elements that make up the connector. Moreover, the blocking mechanisms of the locking ring are complex requiring the orifices for the passage of the pin have to be perfectly aligned, this involving manufacturing and mounting constraints. A further drawback of this solution is that it can also use an overthickness of the riser section, requiring complex manufacture of the riser sections.

Moreover, the French patent application 2866942 corresponding to U.S. Pat. No. 7,341,281 discloses a bayonet riser connector comprising a male element, a female element, a locking ring and blocking mechanism of the locking ring. The connector described in this patent application is not entirely removable, thereby limiting the maintenance and inspection of the connector.

SUMMARY OF THE INVENTION

In order to remedy these drawbacks, the present invention provides a connector for assembling two riser sections. The connector has two riser sections that are joined together by a locking ring by two bayonet connections. Thus, the locking ring is entirely removable, and thus inspectable. In addition, the connector has at least one retaining system or means for retaining the locking ring with respect to the connecting elements, which are preferably on either side of the locking ring. Thus, it is possible to achieve holding and guiding functions during connection, while maintaining easy and rapid assembly of the connector, which does not require any particular tools.

The invention is a connector for assembling two sections of riser, having a first riser section extended by a first connecting element provided with a first set of lugs on its outer surface, a second riser section element extended by a second connecting element provided with a second set of lugs on its outer surface, a locking ring that joins the two connecting elements together, the locking ring comprising a third and a fourth set of lugs on an inner surface that are able to engage the first and second sets of lugs, respectively. The connector also has a retainer for retaining the locking ring with respect to the connecting elements. The retainers are at least partially removable.

According to one embodiment, the retainers are situated at the two ends of the locking ring.

According to one embodiment, the connector also has a sealing sleeve with the sealing sleeve being fitted in the two connecting elements and preferably is fixed in one of the first or second connecting elements.

According to one design, the retainer for retaining the locking ring comprises holding mechanism for holding the locking ring at a first end of the locking ring, and a guide for guiding the locking ring at the second end of the locking ring.

Advantageously, the holding mechanism for holding the locking ring have at least one protrusion that passes into a slot in the locking ring.

Preferably, the guide for guiding the locking ring has at least one cylindrical surface.

According to one embodiment variant, each retainer is formed by two half-rings that are fixed together.

Advantageously, each half-ring is mounted in a groove formed in one of the connecting elements.

Alternatively, each connecting element has a retainer.

Advantageously, one retainer has at least one removable pin.

According to one embodiment, the lugs of the first and second sets of lugs protrude over identical angular ranges.

According to one feature, each set of lugs has at least one row of lugs, and preferably has two rows of lugs.

Advantageously, the lugs in consecutive rows of lugs of one and the same set of lugs are aligned.

According to one embodiment, the rows of lugs of at least one set of lugs are inscribed in identical diameters.

According to one design, the rows of lugs of each set of lugs have at least three, preferably four lugs.

According to one feature, each set of lugs has at least two rows of four lugs.

Advantageously, the first connecting element has, at its end, at least one tooth that fits in a recess in the second connecting element.

According to one embodiment, a first axial clearance is provided between the first set of lugs and the third set of lugs, and a second axial clearance is provided between the second set of lugs and the fourth set of lugs.

Preferably, the first and second clearances are between 0.5 and 30 mm.

Moreover, the invention relates to a riser comprising at least two riser sections joined together by a connector according to one of the above features.

Furthermore, the invention relates to a method for assembling two riser sections with a connector according to one of the above features. For this method, the following steps are carried out:
a) positioning the locking ring around the first connecting element;
b) mounting the first retainer for holding the locking ring with respect to the first connecting element;
c) the first and the second connecting elements are disposed end-to-end by positioning the locking ring around the second connecting element provided with a second retainer, such that the second retainer engages with the locking ring; and
d) locking the locking ring by rotation.

Advantageously, the positioning steps are carried out by moving the locking ring to translate relative to the connecting elements.

The invention also relates to a method for disassembling two riser sections by use of a connector according to one of the above features. For this method, the following steps are carried out:
a) rotating the locking ring it unlocks the ring;
b) releasing the second connecting element from the locking ring;
c) removing the first retainer; and
d) releasing the first connecting element from the locking ring.

Advantageously, the releasing steps are carried out by moving the connecting elements to translate relative to the locking ring.

BRIEF DESCRIPTION OF THE DRAWINGS

Further features and advantages of the device according to the invention will become apparent from reading the following description of nonlimiting exemplary embodiments, with reference to the appended figures that are described below.

FIGS. 7a to 7d illustrate four steps in the method for assembling a connector according to a first embodiment of the invention.

FIG. 8 illustrates an assembled connector according to a second embodiment of the invention.

DETAILED DESCRIPTION OF THE INVENTION

Figure 1:
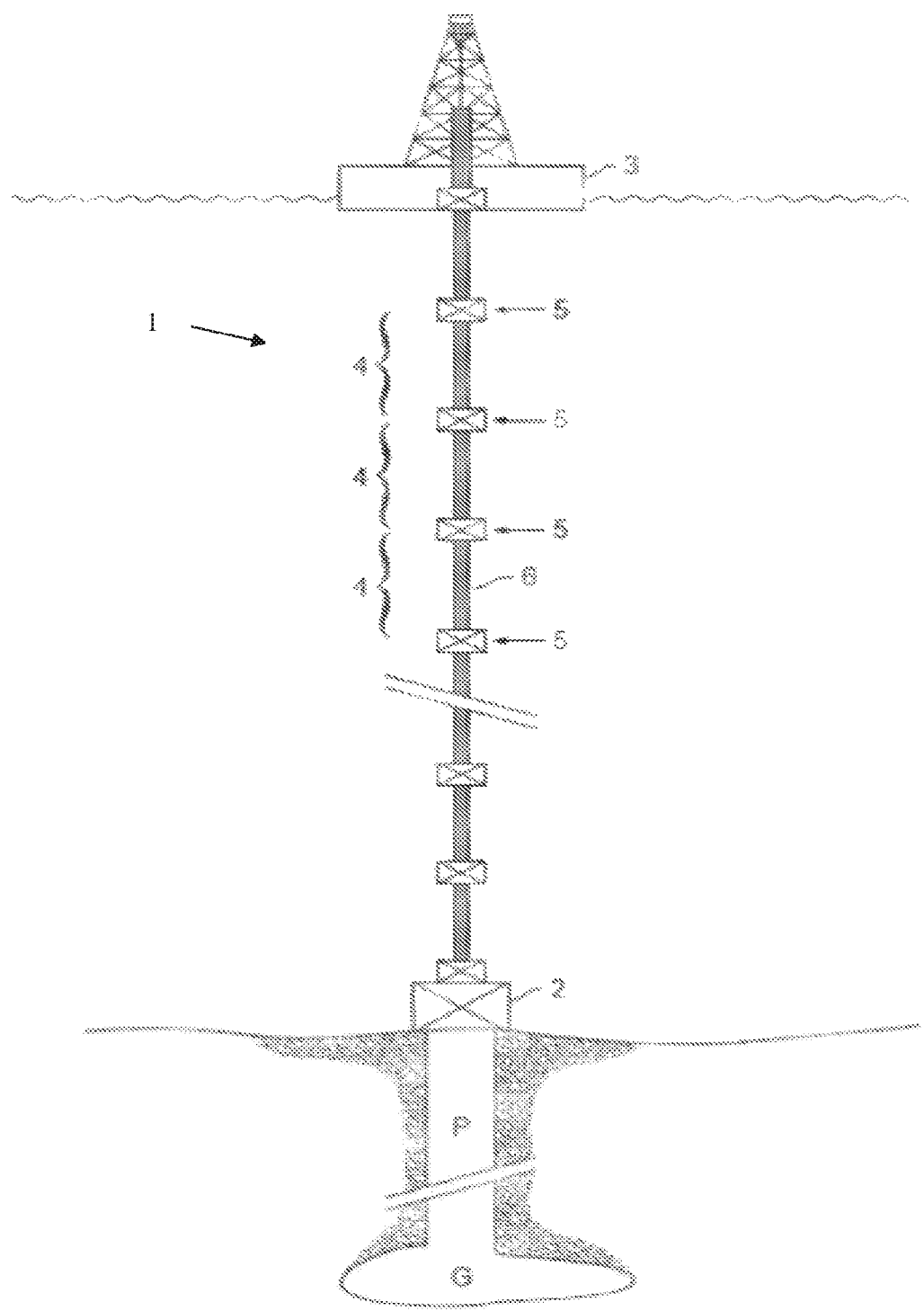
FIG. 1 schematically shows a riser according to the invention.

According to a nonlimiting exemplary embodiment, FIG. 1 schematically illustrates a workover riser 1 installed offshore. The riser 1 extends the well P as far as a reservoir G and extends from the wellhead 2 to a floating support 3, which for example is a platform or a vessel. According to the example illustrated, the wellhead 2 can be provided with a shut-off device commonly referred to as a "BOP" or blowout preventer. Alternatively, the BOP can be situated at the floating support. The riser 1 is formed by assembling several sections 4 that are assembled end-to-end by connectors 5. Each section is composed of a tubular element 6.

The connector according to the invention is suitable for a workover riser, for example as described in relation to FIG. 1. However, the connector according to the invention can also be suitable for a completion riser or a production riser. According to the invention, the connector comprises:
  a first riser section, of substantially tubular shape, extended by a first connecting element, the first connecting element being provided with a first set of lugs on its outer surface, the first connecting element preferably being able to have an inside diameter substantially identical to the inside diameter of the first riser section;
  a second riser section, of substantially tubular shape, extended by a second connecting element, the second connecting element being provided with a second set of lugs on its outer surface, the second connecting element preferably being able to have an inside diameter substantially identical to the inside diameter of the second riser section;

a locking ring, situated outside the first and second connecting elements, the locking ring joining the two connecting elements together, the locking ring comprising, on its inner face, a third set and a fourth set of lugs that are able to engage with the first set and the second set of lugs; and retaining system for retaining the locking ring with respect to the two connecting elements, the retaining system holding and guiding the locking ring, so that the locking ring ensures the alignment of the two connecting elements by use of the retaining system, in particular during the assembly of the connector. The retaining system is at least partially removable. The retaining system is preferably disposed on either side, at the two ends of the locking ring. Thus, it is possible to minimize the outside diameter of the connector, thereby limiting its space requirement. Moreover, this arrangement of the retaining system makes it possible, once locked, for the sensitive parts of the connector (for example the lugs) to be protected from the outside.

Thus, by virtue of the four sets of lugs, two bayonet-type connections are formed with a first connection being between the locking ring and the first connecting element, a second connection being between the locking ring and the second connecting element. In this way, and by virtue of the removable nature of the retaining system, the locking ring is removable with respect to the male and female connecting elements, thereby allowing it to be inspected and maintained.

The connector can be designed and dimensioned to meet the specifications in force, notably those mentioned by the standards API RP 17G and ISO 13628-7 that are edited by the American Petroleum Institute and International Organization for Standardization, respectively.

The different embodiments described above and below can be combined to combine the effects thereof.

According to one embodiment of the invention, the connector can also comprise a sealing sleeve. The sealing sleeve ensures that the assembly of the two riser sections is sealed. The sealing sleeve can be fitted in (that is to say mounted inside) the two connecting elements. It can have seals on its outer surface. Preferably, it is fixed in one of the two connecting elements. This fixing can be realized notably by hooping, welding, by means of circlips, adhesive bonding, screwing or any similar method. The sealing sleeve can have a substantially tubular shape, and may comprise a plurality of slots in its outer surface for the insertion of a plurality of seals. The seals come into contact with the inner surface of the connecting elements. The sealing sleeve can advantageously have an inside diameter substantially identical to the inside diameter of the connecting elements.

In the case in which the connector has two retaining systems and a sealing sleeve. The connection is achieved with a three-point assembly, thereby making the connection easier.

According to one embodiment of the invention, the first connecting element can have, at its end (which is located at the center of the locking ring), at least one tooth that fits in at least one recess situated at the end (which is located at the center of the locking ring) of the second connecting element. The tooth and the recess can be formed in the axial direction of the connecting elements. According to one exemplary embodiment, the first connecting element can comprise between two and six teeth, preferably four, and the second connecting element can comprise between two and six recesses, preferably four recesses. This tooth (these teeth) and this recess (these recesses) make the connection of the two connecting elements easier, preventing rotation about the axis of the riser.

According to one design, the retaining system have an outside diameter substantially identical to the outside diameter of the locking ring. Thus, the radial space requirement of the connector is limited.

According to one embodiment, the retaining systems hold the locking ring at a first end thereof, which may be a holding system for the first end of the locking ring, and a guide which guides the locking ring at the second end of the locking ring. The guide makes it possible to guide the second connecting element during the connection and locking, notably by making it easier to align the different elements. For this purpose, the guide has at least one axial surface (of substantially cylindrical shape) that is intended to contact the outer surface of the locking ring.

Alternatively, the connector may comprise a single retaining system, at one end of the locking ring.

According to a first embodiment of the invention of the retaining system, the retaining system is removable by being formed in several assembled parts. Two parts can be assembled notably by screwing. Advantageously, each retaining system is formed by two half-rings, also referred to as half-shells, that are able to be assembled. The two half-rings can be formed by a ring cut into two parts on a diameter of the ring. Once assembled, the two half-rings form substantially a tube. This design allows rapid connection. Alternatively, each retaining system can be formed by more than two parts, to substantially form a tube once assembled.

According to one design, each retaining system can be mounted in a groove in a connecting element. Thus, once mounted, the retaining system are immovable, and axial movements of the retaining system are avoided, thereby allowing optimal retention of the locking ring with respect to the connecting elements.

For this embodiment, the holding mechanism, which is formed for example by two half-rings, can advantageously comprise:

at least one axial shoulder forming an axial abutment in a first direction, at least one protrusion, which is preferably a radial protrusion oriented toward the inside of the holding mechanism, which engages with the locking ring, in particular with a slot formed in the locking ring. The protrusion can be a circumferential protrusion. Preferably, there is a clearance between the protrusion and the slot, which allows a relative rotational movement of the locking ring with respect to the holding mechanism.

When viewed in axial section, the holding system can be substantially J-shaped with the long side of the J being for placement in the groove in the first connecting element, and the short side of the J that is a protrusion engaging a slot in the locking ring.

For this embodiment, the guide, formed for example by two half-rings can advantageously comprise:

at least one axial shoulder forming an axial abutment in a second direction, opposite to the first direction. A clearance can be provided between the locking ring and the guide to allow a relative rotational movement of the locking ring with respect to the guide.

When viewed in axial section, the guide can be substantially L-shaped with the long side of the L being for placement in the groove in the second connecting element, and the short side of the L being for engaging with the locking ring.

In order to make the engagement of the retaining system(s) and the locking ring easier, the ends of the locking ring can be formed to engage with the retaining system. For example, the two ends of the locking ring can have a shoulder, and one of the two ends of the locking ring can have a slot for engaging a protrusion.

According to a second embodiment of the retaining system, the retaining system can be in one piece with the connecting elements so that each connecting element has a retaining system. The retaining system can be produced simultaneously with the connecting element, for example by forging or by machining.

For this embodiment, the holder or holding system can advantageously comprise;
- at least one axial shoulder formed by an increase in the diameter of the first connecting element, the axial shoulder forming an axial abutment in a first direction,
- at least one removable pin that is able to be inserted into the holding system and the locking ring. The pin preferably protrudes in a manner oriented radially toward the inside of the holding system, and engages the locking ring, in particular with a slot formed in the locking ring. The pin can be substantially cylindrical in shape. Preferably, there is a clearance between the pin and the slot, which allows a relative rotational movement of the locking ring with respect to the holding system.

When viewed in cross section, the holding system can be substantially L-shaped with the long side of the L having an increase in the diameter of the first connecting element, and the short side of the L being for engaging with the locking ring. The short side of the L has at least one orifice for the insertion of the removable pin.

For this embodiment, the holding system can comprise between one and eight pins, and preferably four or six removable pins.

The guide can advantageously comprise:
- at least one axial shoulder formed by an increase in the diameter of the second connecting element, forming an axial abutment in a second direction, opposite to the first direction. A clearance can be provided between the locking ring and the guide allows a relative rotational movement of the locking ring with respect to the guide.

When viewed in cross section, the guide can be substantially L-shaped with the long side of the L being an increase in the diameter of the second connecting element, and the short side of the L being intended for engaging the locking ring.

In order to make the engagement of the retaining system and the locking ring easier, the ends of the locking ring can be formed to engage with the retaining system. For example, the two ends of the locking ring can have a shoulder, and one of the two ends of the locking ring can have a slot for engaging the removable pin(s).

According to a third embodiment of the retaining system, a retaining system according to the first embodiment (retainer formed by two half-shells) can be realized at a first end, and a retainer according to the second embodiment (retaining means in one piece with the connecting element) can be at the second end.

Preferably, the locking ring is in one piece.

According to one embodiment of the invention, the lugs of the first and second sets of lugs (and even more so of the third and fourth sets of lugs) protrude over identical angular ranges. The angular range of a lug is the angle formed by the portion of a circle occupied by the lug on the diameter in which it is inscribed. For example, if a set of lugs has lugs which each represent one sixth of a circle, then the angular range of the lug is 60°. Thus, by virtue of this design, the locking and unlocking of the locking ring with respect to the two connecting elements can result from a single rotation and becomes simultaneous. In this way, the locking ring is only driven in rotation between two angular positions.

According to a first embodiment of the invention, the circumferential distributions of the third and fourth sets of lugs are symmetric with respect to a radial plane passing between the two sets of lugs. In other words, the lugs of the third and fourth sets of lugs face one another (are aligned). Thus, the locking ring can have a plane of symmetry, making it easier to design. According to a second embodiment of the invention, the circumferential distributions of the third and fourth sets of lugs are opposite with the circumferential distribution of the fourth set of lugs is offset with respect to the third set of lugs, by an angle corresponding to the angular range of a lug. In other words, the lugs of one set face the gaps in the other set. According to a third embodiment of the invention, the circumferential distributions of the lugs of the third and fourth sets are offset with respect to one another by an angle corresponding to half the angular range of a lug (or any other angle).

Alternatively, the lugs of the first and second sets of lugs (and even more so of the third and fourth sets of lugs) protrude over different angular ranges. Thus, the two bayonet connections are unlocked by different rotations.

According to one embodiment of the invention, each set of lugs can have at least one row of lugs. A row of lugs has a circumferential distribution of lugs. In each row of lugs, there is an alternation of protruding lugs and empty spaces (gaps). The empty spaces allow the passage of the lugs corresponding to the set of lugs with which the row of lugs engages.

According to one embodiment of the invention, the sets of lugs can comprise a plurality of rows of lugs, in particular two or three rows of lugs. The plurality of rows of lugs allows a reduction in the axial forces on the lugs, making it possible to limit the mechanical fatigue of the lugs.

According to one possible design, each set of lugs has a single row of lugs. According to a first alternative, each set of lugs has two rows of lugs. According to a second alternative, each set of lugs has three rows of lugs. According to a third alternative, two of the four sets of lugs have one row of lugs, and the two other sets have two rows of lugs. According to a fourth alternative, two of the four sets of lugs have two rows of lugs, and the two other sets have three rows of lugs.

In the case in which one set of lugs has a plurality of rows of lugs, the rows of lugs can be inscribed in different diameters. This design allows the passage of the row of lugs of smaller diameter, and thus it is possible to lock and unlock the bayonet connection with a single rotation.

In the case in which one set of lugs has several rows of lugs, the rows of lugs can be inscribed in identical diameters. This design, when the sets of lugs are aligned, makes it possible to lock and unlock the bayonet connection with a single rotation. This design (several rows of lugs inscribed in identical diameters), when the sets of lugs are not aligned, may involve insertion and locking of the bayonet connection with a relative movement made up of a first movement in translation, a first rotation, a second movement in translation and a second rotation. This design thus allows the connection to be secured better, since it makes it possible to avoid undesired disconnection.

Each row of lugs has a plurality of lugs distributed regularly over a diameter. Advantageously, the lugs of different rows can be arranged to allow locking through 360°. According to one design, the rows of lugs may comprise three lugs having an angular range of 60°, or 40°. According to one alternative, the rows of lugs may comprise four lugs having an angular range of 45°, or 30°. According to one alternative, the rows of lugs may comprise five lugs having an angular range of 36° or 24°. According to another alternative, the rows of lugs may comprise six lugs having an angular range of 30°, or 20°. According to one alternative, the rows of lugs may comprise eight lugs having an angular range of 22.5°, or 15°. In order to have the lugs protruding over identical angular ranges, all the rows of all the sets of lugs may have the same number of lugs.

According to one exemplary embodiment, the four sets of lugs each have two rows of four lugs having an angular range of 45°. The rows of lugs are aligned and inscribed in identical diameters. Thus, the connector can be locked by way of a single rotation through 45°.

In order to make mounting easier and to avoid the problems of blocking of the lugs in the event of wear, at least one axial clearance can be realized between a connecting element and the locking ring. The axial clearance is preferably strictly positive.

According to one embodiment of the invention, a positive axial clearance is realized between each connecting element and the locking ring. Thus, the problems associated with wear of the lugs can be avoided, making it easier to handle the locking ring. The two axial clearances can be identical or different. The axial clearances are distributed in the connector during the steps of mounting, locking, unlocking, and tensioning of the connector. For example, during mounting, an axial clearance can exist between the mutually engaging lugs, and once the locked connector is tensioned, an axial clearance can exist between the ends of the two connecting elements.

Each, strictly positive, axial clearance can be between 0.5 and 30 mm, and preferably between 0.5 and 10 mm. Above 30 mm, the technical effect relating to the avoidance of blocking problems is still present, but the space requirement increases.

Moreover, according to one design of the connector, the locking ring can have means for limiting the rotation of the locking ring, for example abutments, which limit rotation of the locking ring for an angle equal to the angular range of the lugs.

In addition, according to one feature of the invention, the connector can comprise blocking means for blocking the locking ring in at least one position, notably in the locked position. These blocking means can also make it possible to prevent the rotation of the locking ring with respect to the first connecting element in the unlocked position. The blocking means for blocking the locking ring make it possible to avoid any undesired unlocking of the locking ring.

According to one design of the invention, the locking ring can comprise turning means which are outside the locking ring. These turning means make it possible to turn the locking ring. For example, the turning means may be a handling bar.

FIGS. 2 to 6 illustrate a connector according to a first embodiment of the invention.

Figure 2:
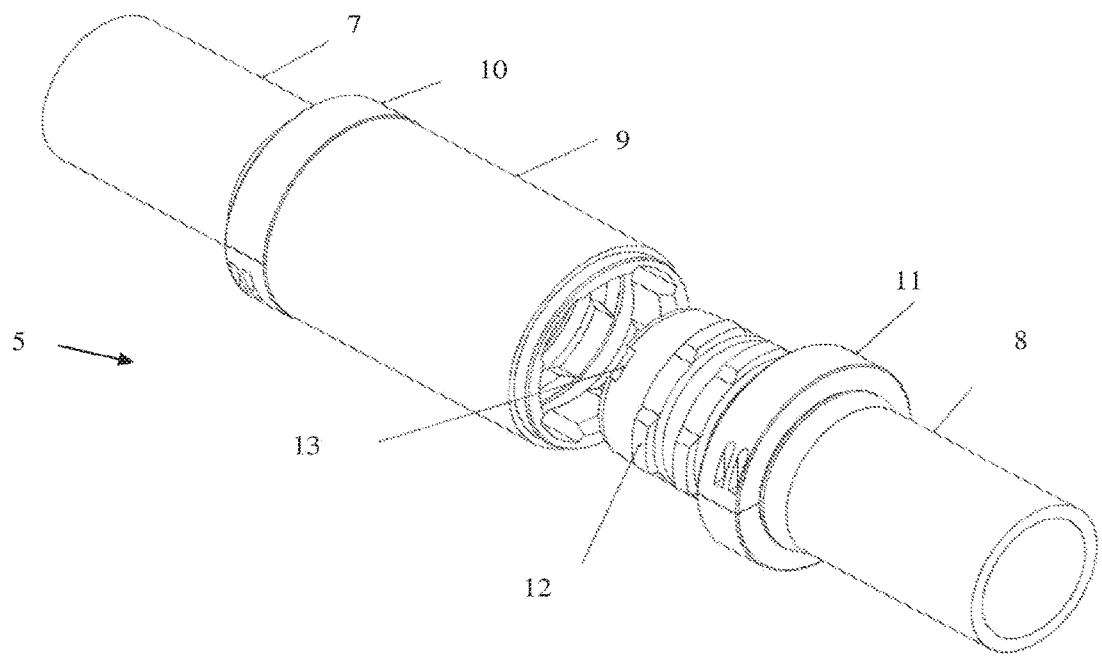
FIG. 2 illustrates a connector before assembly according to a first embodiment of the invention.

FIG. 2 illustrates, schematically and in a nonlimiting manner, a connector according to a first embodiment of the invention, before it is connected to the second connecting element. The connector 5 has a first connecting element 7, which extends a first riser section (not shown). The first connecting element 7 is provided with a first set of lugs (not shown). The connector 5 has a second connecting element 8, which extends a second riser section (not shown). The second connecting element 8 is provided with a second set of lugs 12. As shown (in a nonlimiting manner), the second set of lugs has two rows of four lugs. Furthermore, the second connecting element 8 has a recess 13 that engages with a tooth on the first connecting element 7. Moreover, the connector 5 has a locking ring 9. The locking ring 9 has a third and a fourth set of lugs that are able to engage with the first and second sets of lugs, respectively, of the first and second connecting elements 7 and 8. Furthermore, the connector 5 respectively has ends at which are retaining systems 10 and 11. The retaining system 10 engages one end of the locking ring 9 and the retaining system 11 engages the other end of the locking ring. A holder 10' engages one end of the locking ring and a guide 11' slides over another end of the locking ring.

Figure 3:
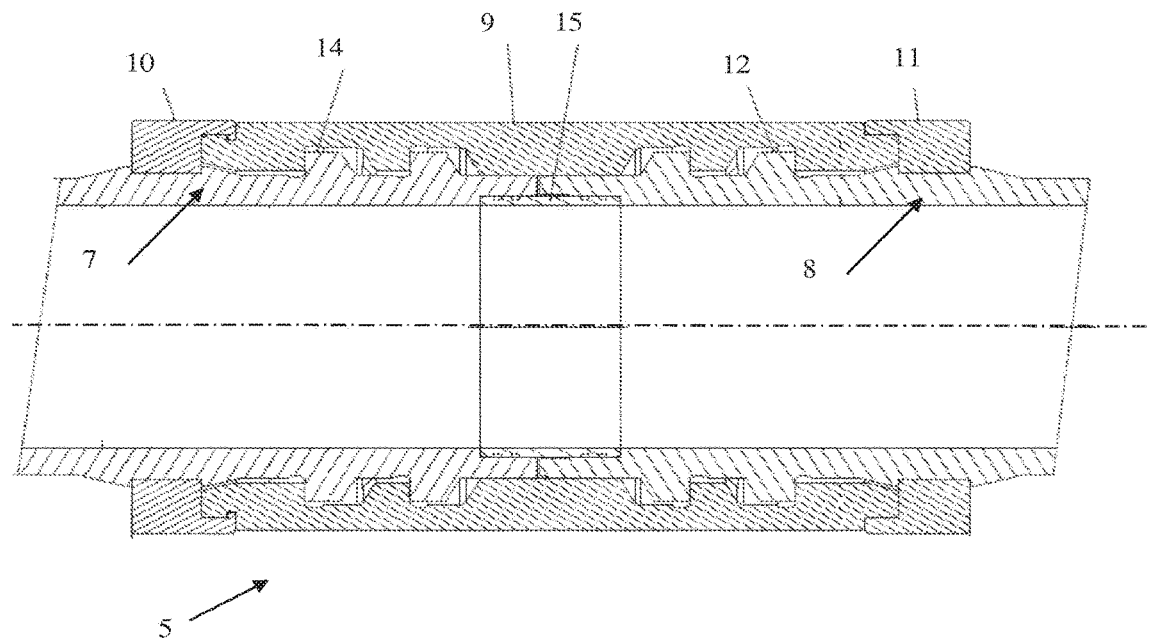
FIG. 3 is a cross-sectional view of an assembled connector according to a first embodiment of the invention.

FIG. 3 illustrates, schematically and in a nonlimiting manner, the connector from FIG. 2, in a cross-sectional view, once the connector has been assembled. The connector 5 has a first connecting element 7, which extends a first riser section (not shown). The first connecting element 7 is provided with a first set of lugs 14 on its outer surface. The connector 5 has a second connecting element 8, which extends a second riser section (not shown). The second connecting element 8 is provided with a second set of lugs 12 on its outer surface. As shown (in a nonlimiting manner), the first 14 and the second 12 sets of lugs have two rows of four lugs. Furthermore, the connector 5 has a locking ring 9. The locking ring 9 has a third and a fourth set of lugs that are able to engage with the first 14 and second 12 sets of lugs, respectively, of the first and second connecting elements 7 and 8. The third and fourth sets of lugs are disposed on the inner surface of the locking ring 9. The retaining system 10 has a holder 10' which engages a locking ring 9 located on the first connecting element 7 and the retaining system 11 has a guide 11' which engages the second connecting element 8. As shown, the part of retaining system 10' is substantially J-shaped, with a circumferential protrusion which engages with a slot made in the outer surface of the locking ring 9. As shown, a part of the guide 11' is substantially L-shaped with a shoulder which engages with one end of the locking ring 9. Each retaining system 10 and 11 is formed by two assembled half-shells. Moreover, the connector 5 has a sealing sleeve 15. The sealing sleeve 15 is fitted in the two connecting elements 7 and 8. The sealing sleeve 15 is substantially tubular and has slots for the insertion of seals.

Figure 4:
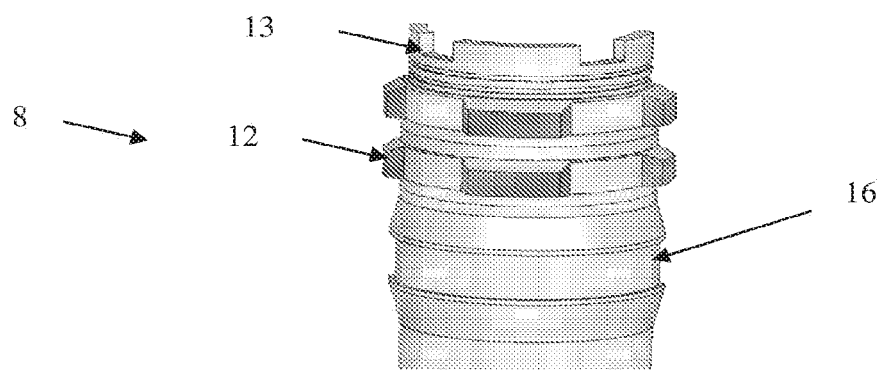
FIGS. 4 and 5 illustrate two connecting elements according to a first embodiment of the invention.

FIG. 4 illustrates, schematically and in a nonlimiting manner, a second connecting element 8 for the embodiment in FIGS. 2 and 3. The second connecting element 8 has, on its outer surface, a set of lugs 12 comprising two rows of four lugs with the lugs being aligned and inscribed in identical diameters. The end of the connecting element 8 has recesses 13 (for example four recesses) that are able to engage with teeth on the first connecting element. Moreover, the second connecting element 8 has a groove 16 that receives a retaining means, for example a guide.

Figure 5:
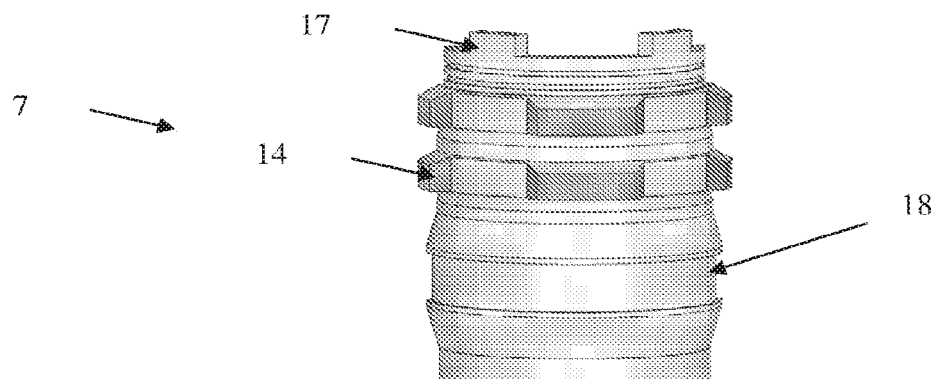

FIG. 5 illustrates, schematically and in a nonlimiting manner, a first connecting element 7 for the embodiment in FIGS. 2 and 3. The first connecting element 7 has, on its outer surface, a set of lugs 14 comprising two rows of four lugs with the lugs being aligned and inscribed in identical diameters. The end of the connecting element 7 has teeth 17 (for example four teeth) that are able to engage with recesses in the second connecting element. Moreover, the first connecting element 7 has a groove 18 that is able to receive a retaining means, for example a holding means.

Figure 6:
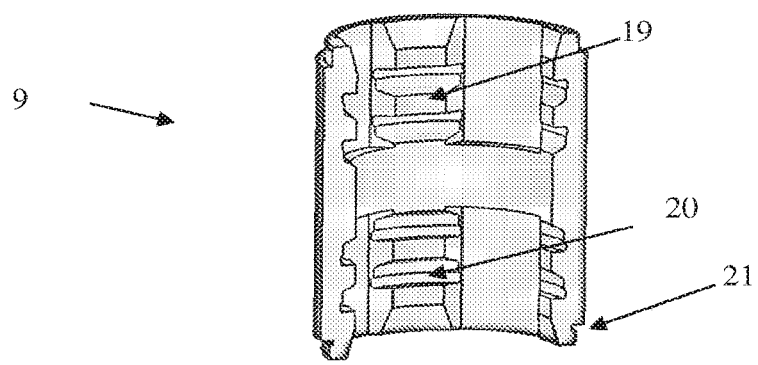
FIG. 6 illustrates a locking ring according to a first embodiment of the invention.

FIG. 6 illustrates, schematically and in a nonlimiting manner, a locking ring 9 for the embodiment in FIGS. 2 and 3. The locking ring 9 has, on its inner surface, two sets of lugs 19 and 20. Each set of lugs has two rows of four lugs with the lugs being aligned and inscribed in identical diameters. The set of lugs 19 is able to engage with the set of lugs of the first connecting element, and the set of lugs 20 is able to engage with the set of lugs of the second connecting element. As shown, the locking ring 9 has a slot 21 that is able to receive a protrusion of a retaining system.

Figure 9:
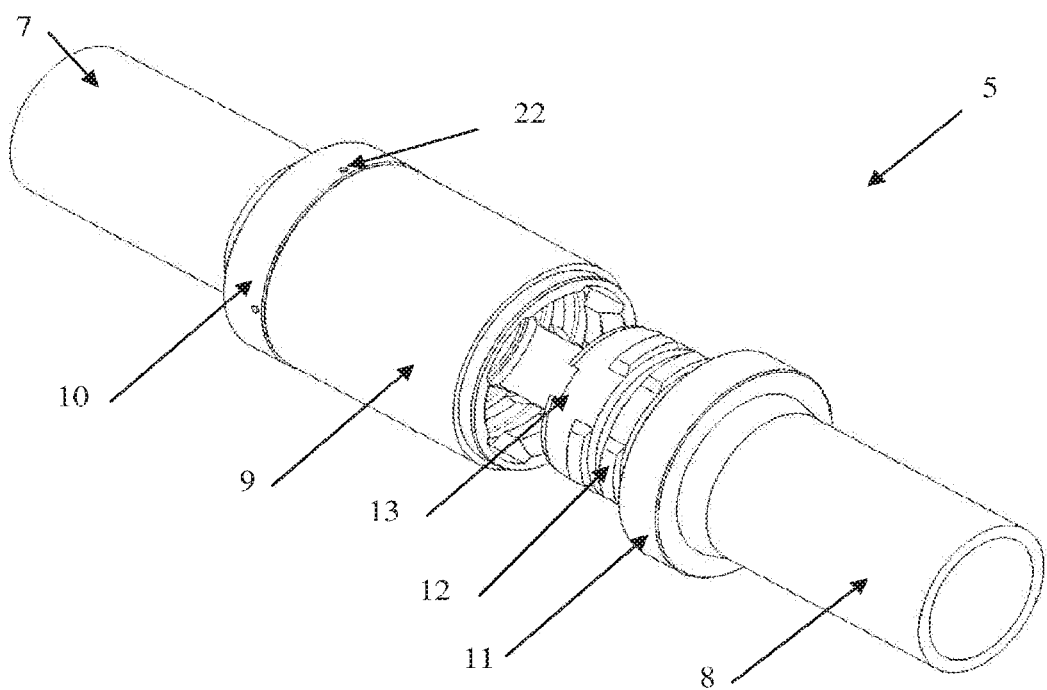
FIG. 9 illustrates a connector before assembly according to the second embodiment of the invention.

FIGS. 8 and 9 illustrate a connector according to a second embodiment of the invention. For this second embodiment, the locking ring can be substantially identical to the one illustrated in FIG. 6.

FIG. 8 illustrates, schematically and in a nonlimiting manner, the connector, in a cross-sectional view, once the connector has been assembled. The connector 5 has a first connecting element 7, which extends a first riser section (not shown). The first connecting element 7 is provided with a first set of lugs 14 on its outer surface. The connector 5 has a second connecting element 8, which extends a second riser section (not shown). The second connecting element 8 is provided with a second set of lugs 12 on its outer surface. As shown (in a nonlimiting manner), the first 14 and the second 12 sets of lugs have two rows of four lugs. Moreover, the connector 5 has a locking ring 9. The locking ring 9 has a third and a fourth set of lugs that are able to engage with the first 14 and second 12 sets of lugs, respectively, of the first and second connecting elements 7 and 8. The third and fourth sets of lugs are disposed on the inner surface of the locking ring 9. Furthermore, the connector 5 has a retaining system 10, 11 for the locking ring 9 with the retaining systems 10 and 11 being positioned at the two ends of the locking ring 9. The retaining systems having a holding system 10 for holding the locking ring 9 with the holding system 10 being integrated in the first connecting element 7, and a retaining system 11 integrated in the second connecting element 8. As shown, the holding system 10 is substantially L-shaped, with an orifice for the passage of at least one removable pin 22, which engages with a slot made in the outer surface of the locking ring 9. As shown, the retaining system 11 is substantially L-shaped with a shoulder which engages with one end of the locking ring 9. In addition, the connector 5 has a sealing sleeve 15. The sealing sleeve 15 is fitted in the two connecting elements 7 and 8. The sealing sleeve 15 is substantially tubular and has slots for the insertion of seals.

FIG. 9 illustrates, schematically and in a nonlimiting manner, a connector according to the embodiment of the invention in FIG. 8, before it is connected to the second connecting element. The connector 5 has a first connecting element 7, which extends a first riser section (not shown). The first connecting element 7 is provided with a first set of lugs (not shown). The connector 5 has a second connecting element 8, which extends a second riser section (not shown). The second connecting element 8 is provided with a second set of lugs 12. As shown (in a nonlimiting manner), the second set of lugs has two rows of four lugs. In addition, the second connecting element 8 has a recess 13 that is intended to engage with a tooth of the first connecting element 7. Moreover, the connector 5 has a locking ring 9. The locking ring 9 has a third and a fourth set of lugs that are able to engage with the first and second sets of lugs, respectively, of the first and second connecting elements 7 and 8. Furthermore, the connector 5 has retaining systems 10, 11 for the locking ring 9, the retaining systems 10 and 11 being positioned at the two ends of the locking ring 9. The retaining systems 10 and 11 have a holding system 10 for holding the locking ring 9, the holding system 10 being integrated into the first connecting element 7, and a holding system 11 integrated into the second connecting element 8. Pins 22 are provided between the holding system 10 and the locking ring 9.

In addition, the present invention relates to a riser comprising at least two riser sections that are joined together by a connector as described above. The connector can be realized according to any one of the combinations of embodiments described above: presence of a sealing sleeve, design of the retaining system, plurality of rows of lugs, rows of lugs inscribed on identical or different diameters, sets of lugs that are aligned or not, axial clearances, etc.

Moreover, the present invention relates to the use of such a riser (with any one of the combinations of embodiments described above) for the production of a petroleum effluent offshore, for a completion operation, a workover operation, etc.

Furthermore, the present invention relates to a method for assembling two riser sections by use of a connector according to the invention (with any one of the combinations of embodiments described above). For this method, the following steps can be implemented:

a) positioning the locking ring around the first connecting element, and positioning the first riser section in the locking ring without being locked;

b) mounting a first retaining system (preferably a holding means) on the first connecting element in order to hold the locking ring with respect to the first connecting element, and thus the locking ring cannot move to translate with respect to the first connecting element;

c) the first and the second connecting elements are disposed end-to-end by positioning the locking ring around the second connecting element provided with the second retaining system (preferably a guide means), and thus the second riser section is positioned in the locking ring without being locked; and d) locking the locking ring by rotation of the locking ring, preferably by use of a single rotation (in the case of lugs having the same angular range), thereby locking the two connecting elements which can no longer move relative to the locking ring.

For step d), during locking, the rotation of the ring causes the engagement of the first and third sets of lugs and of the second and fourth sets of lugs, respectively. The rotation for simultaneous locking of the two bayonet-type connections is a rotation through an angle corresponding to the angular range of the lugs. For example, if the lugs have an angular range of 36°, the locking rotation is a rotation through 36°.

For step b), mounting the first retaining system is performed by assembling two half-shells within a groove formed in the first connecting element. The retaining systems may have a protrusion which engages with a slot in the locking ring.

In the same way, the mounting of the second retaining means can be implemented by assembling two half-shells within a groove formed in the second connecting element. The retaining system can have a shoulder which engages the end of the locking ring. The second retaining system can be mounted on the second connecting element before or simultaneously with one of steps a) and b), or between steps b) and c).

The positioning steps place the locking ring with respect to the connecting element in question, such that a single subsequent rotation locks the connector.

In some cases, the insertion steps correspond to a single movement of translation of the ring relative to the connecting element. This is the case for example when the set of lugs in question only comprises one row of lugs, or when the set of lugs in question has a plurality of rows of lugs that are inscribed in different diameters, or when the lugs are aligned. The translational movement makes it possible to position the lugs in order to block the bayonet connection.

In other cases, the insertion steps correspond to a combined movement comprising a first step of translational movement followed by a first rotation followed by a second translational movement. These are relative movements between the locking ring and the connecting element in question. This is the case for example when the set of lugs in question comprises a plurality of rows of lugs inscribed in identical diameters and with offset angular ranges. The two first relative movements allow the passage of a first row of lugs. The last step of translational movement makes it possible to position the lugs in order to block the bayonet connection.

Moreover, the present invention relates to a method for disassembling two riser sections assembled by of a connector according to the invention (with any one of the combinations of embodiments described above). For this method, the following steps can be implemented:
a) unlocking the locking ring by rotation of the locking ring, which is, preferably by a single rotation (in the case of lugs having the same angular range), unlocking the two connecting elements, which may be able to move relative to the locking ring;
b) releasing the second connecting element from the locking ring, and extracting the second connecting element from the locking ring, while the first connecting element is unlocked, but is prevented from translational movement in the locking ring, notably by at least one retaining system;
c) removing the retaining means between the locking ring and the first connecting element, and thus the first connecting element is positioned in the locking ring, is unlocked and is free to move; and
d) withdrawing the locking ring from the first connecting element, so that the male connecting element is extracted from the locking ring.

For step a), during unlocking, the rotation of the ring releases the engagement of the first and third sets of lugs and of the second and fourth sets of lugs, respectively. The rotation for the simultaneous unlocking of the two bayonet-type connections is a rotation through an angle corresponding to the angular range of the lugs. For example, if the lugs have an angular range of 36°, the unlocking rotation is a rotation through 36°.

For step c), the removing of the first retaining system by disassembling two half-shells from a groove formed in the first connecting element. The retaining system can have a protrusion which engages with a slot in the locking ring.

In the same way, the removal of the second retaining means disassembles two half-shells from a groove formed in the second connecting element. The retaining system can have a shoulder which engages the end of the locking ring. The removal of the second retaining system from the second connecting element can be achieved after or simultaneously with one of the steps of the disassembly method.

The withdrawing/releasing steps extract the connecting element in question from the locking ring, starting from a position in which the connecting element is positioned in the locking ring.

In some cases, the withdrawing/releasing steps correspond to a single movement in translation of the ring relative to the connecting element. This is the case for example when the set of lugs in question has only one row of lugs, or when the set of lugs in question has a plurality of rows of lugs inscribed in different diameters, or when the lugs are aligned. This movement in translation makes it possible to release the lugs from the bayonet connection.

In other cases, the withdrawing/releasing steps correspond to a combined movement comprising a first step of translational movement, followed first by rotation and followed second by a translational movement. These are relative movements between the locking ring and the connecting element in question. This is the case for example when the set of lugs in question comprises a plurality of lugs that are offset and inscribed in identical diameters. The first step of translational movement makes possible disengagement of the lugs of the second set of lugs. The two last relative movements allow the passage of a first row of lugs.

For the embodiment in which two axial clearances are provided on either side between the connecting elements and the locking ring, the distribution of the axial clearances is illustrated in FIGS. 7a to 7d for different assembly steps. These figures are cross-sectional views similar to the cross-sectional view in FIG. 3, for which only one side of the cross-sectional view is shown. These figures illustrate steps of joining the connecting element 8 to the connecting element 7 by use of a locking ring 9 and a removable retaining system 10 and 11. The connector comprises a sealing sleeve 15. In these figures, the reference C indicates contact between the parts, and the reference J indicates the existence of a clearance between the elements. The value of the clearance J can vary depending on the connection step. For this example, the two axial clearances J are strictly positive, can be different or identical, and can be 0.5, 1, 1.5, 2, 2.5, 3, 4 or 5 mm.

The locking of the connector can be realized by the following operations, when the first connecting element is already mounted in the locking ring:
1. Approach phase (FIG. 7a): fitting of the locking ring 9 around the second connecting element 8. The lugs of the second connecting element 8 pass between those of the locking ring 9.
2. Fitting continues (FIG. 7b), the locking ring 9 comes into contact with the retaining system 11. At this stage, a clearance (for example of 1 mm) is introduced at the lugs of the second (second connecting element 8) and the fourth set (locking ring 9).
3. At the end of fitting (FIG. 7c), the end of the second connecting element 8 comes into contact with the end of the first connecting element 7. A clearance, for example with a value of 1 mm, can be introduced at the lugs of the first (first connecting element 7) and the third (locking ring 9) set. At the end of this step, the connector is ready to be locked.
4. The rotation of the ring for locking (FIG. 7d) matches up the four rows of lugs. This no longer risks being impeded since the sliding surface is situated in a zone that is subject to little stress. At the end of locking, the tensioning of the riser brings the toothed portions of the two bayonet systems into contact. Thus, contact C is realized at the lugs of the four sets of lugs, and there is an axial clearance between the ends of the two connecting elements 7 and 8. In addition, a clearance can be present between the end of the sealing sleeve and the end of the second connecting element 8.

The device according to the invention affords an advantageous solution for rapidly and easily mounting a riser without it being necessary to carry out precise relative positioning prior to assembly. Specifically, the connection of one riser section to another riser section can be carried out in a single operation by means of the rotation of the locking ring. This connection makes it possible to connect together and seal two riser sections. Furthermore, by virtue of its design, the connector can be easily removable and inspectable, thereby making maintenance operations easier. In addition, a large number of locking/unlocking operations are allowed through the use of bayonet connections.

The invention claimed is:

1. A connector for assembling sections of a riser including a first riser section which is extended by a first connecting element provided with a first set of lugs on an outer surface of the first connecting element, a second riser section which is extended by a second connecting element provided with a second set of lugs on an outer surface of the second connecting element, a locking ring for joining the first and second connecting elements together including in a locked configuration, the locking ring comprising a third and a fourth set of lugs on an inner surface of the locking ring which are configured to engage the first and second sets of lugs, at least partially removeable retainers for connecting the retainer to the first and second connecting elements, the four sets of lugs respectively comprising first and second bayonet connection means with the first bayonet connection means providing a removeable locked longitudinal connection of the locking ring to the first connection element and the second connection means proving a removeable locked longitudinal connection of the locking ring to the second connecting element, the first bayonet connection means permitting the first connecting element to move longitudinally relative to the locking ring, by passing the first set of lugs through spaces between the lugs of the third set of lugs to a position from which the locking ring may be rotated while the first and third sets of lugs are in engagement to the locked connection of the first connecting element to the locking ring and the second bayonet connection means permitting the second connecting element to move longitudinally relative to the locking ring by passing the second set of lugs through spaces between the lugs of the fourth set of lugs to a longitudinal position from which the locking ring may be rotated while the second and fourth sets of lugs are in engagement to the locked connection of the second connecting element to the locking ring.

2. The connector as claimed in claim 1, wherein the retainers are located at ends of the locking ring.

3. The connector as claimed in claim 1, comprising a sealing sleeve, which is fitted in the two connecting elements.

4. The connector as claimed in claim 3, wherein the sealing sleeve is fixed to the first or the second connecting element.

5. The connector as claimed in claim 1, wherein the retainers for retaining the locking ring comprise a holder for holding the locking ring at a first end of the locking ring, and a guide for guiding the locking ring at a second end of the locking ring.

6. The connector as claimed in claim 5, wherein the holder for holding the locking ring has at least one protrusion that passes into a slot in the locking ring.

7. The connector as claimed in claim 6, wherein the guide for guiding the locking ring has at least one cylindrical surface.

8. The connector as claimed in claim 5, wherein the guide for guiding the locking ring has at least one cylindrical surface.

9. The connector as claimed in claim 8, wherein one of the retainers has at least one removable pin.

10. The connector as claimed in claim 1, wherein each retainer comprises two half-rings that are fixed together.

11. The connector as claimed in claim 10, wherein each half-ring is mounted in a groove formed in one of the connecting elements.

12. The connector as claimed in claim 1, wherein each connecting element comprises a retainer.

13. The connector as claimed in claim 1, wherein the lugs of the first and second sets of lugs protrude over identical angular ranges.

14. The connector as claimed in claim 1, wherein each set of lugs has at least one row of lugs.

15. The connector as claimed in claim 14, wherein each set of lugs has two rows of lugs.

16. The connector as claimed in claim 14, wherein the lugs are located in consecutive rows of lugs which are aligned.

17. The connector as claimed in claim 14, wherein the rows of lugs of at least one set of lugs have identical diameters.

18. The connector as claimed in claim 14, wherein the rows of lugs of each set of lugs have at least three lugs.

19. The connector as claimed in claim 1, wherein each set of lugs has at least two rows each containing four lugs.

20. The connector as claimed in claim 1, wherein the first connecting element has, at its end, at least one tooth fitted into a recess in the second connecting element.

21. The connector as claimed in claim 1, comprising a first axial clearance between the first set of lugs and the third set of lugs, and a second axial clearance between the second set of lugs and the fourth set of lugs.

22. The connector as claimed in claim 21, wherein the first and second clearances are between 0.5 and 30 mm.

23. A riser comprising at least two riser sections joined together by a connector as claimed in claim 1.

24. A method for assembling two riser sections by using a connector as claimed in claim 1, comprising:
 a) positioning the locking ring around the first connecting element;
 b) mounting the first retainer for holding the locking ring with respect to the first connecting element;
 c) positioning the first and the second connecting element end-to-end by positioning the locking ring around the second connecting element provided with a second retainer, to have the second retainer engage the locking ring; and
 d) locking the locking ring by rotation of the locking ring around the first connecting element.

25. The method as claimed in claim 24, comprising translating the locking ring relative to the connecting elements.

26. A method for disassembling two riser sections in accordance with a connector as claimed in claim 1, comprising:
 e) rotating the locking ring to unlock the locking ring;
 f) releasing the second connecting element from the locking ring;
 g) removing the first retainer; and h) releasing the first connecting element from the locking ring.

27. The method as claimed in claim 26, wherein the releasing steps (f) and (h) are carried out by moving the connecting elements to translate relative to the locking ring.

\* \* \* \* \*